United States Patent [19]
Mish

[11] Patent Number: 6,024,285
[45] Date of Patent: Feb. 15, 2000

[54] WIRELESS COMMUNICATION DEVICES AND METHODS OF FORMING WIRELESS COMMUNICATION DEVICES

[75] Inventor: William Mish, Boise, Id.

[73] Assignee: Micron Technology, Inc., Boise, Id.

[21] Appl. No.: 08/914,370

[22] Filed: Aug. 19, 1997

[51] Int. Cl.[7] .................................................. G06K 19/02
[52] U.S. Cl. ........................ 235/492; 235/486; 156/300
[58] Field of Search ................................... 235/492, 451, 235/441, 488, 486, 487; 174/52.2; 156/298, 300, 311, 213; 29/592, 600

[56] References Cited

U.S. PATENT DOCUMENTS

| | | | |
|---|---|---|---|
| 4,075,632 | 2/1978 | Baldwin et al. | 343/6.8 |
| 4,926,182 | 5/1990 | Ohta et al. | 342/44 |
| 5,585,618 | 12/1996 | Dros | 235/492 |
| 5,612,532 | 3/1997 | Iwasaki | 235/492 |
| 5,621,412 | 4/1997 | Sharpe et al. | 342/51 |
| 5,649,296 | 7/1997 | MacLellan et al. | 455/38.2 |
| 5,671,525 | 9/1997 | Fidalgo | 235/492 |
| 5,690,773 | 11/1997 | Fidalgo et al. | 156/300 |
| 5,776,278 | 7/1998 | Tuttle et al. | 156/213 |
| 5,837,992 | 11/1998 | Onozawa | 235/488 |
| 5,852,289 | 12/1998 | Masahiko | 235/492 |

*Primary Examiner*—Donald Hajec
*Assistant Examiner*—Daniel St. Cyr
*Attorney, Agent, or Firm*—Wells, St. John, Roberts, Gregory & Matkin P.S.

[57] ABSTRACT

Wireless communication devices and methods of forming the same are described. In one implementation, an integrated circuitry transceiver chip and an antenna are operably coupled and mounted within a housing member. A cover(s) is (are) disposed over the chip and antenna and effectively seals the chip and antenna therewithin. In a preferred implementation, the chip, antenna, and a power source are mounted on a printed circuit substrate which is nestedly received by the housing member and effectively sealed therewithin by the cover. The housing member preferably includes structure which receives at least one of the chip and/or power source to provide a nested, compact device which can be carried by or upon a person. In one aspect, the housing member is formed from a material which does not meaningfully, if at all, degrade the electrical performance of the device. The cover(s) is preferably formed from the same material as the housing member to facilitate assembly of the device through bonding therebetween.

14 Claims, 8 Drawing Sheets

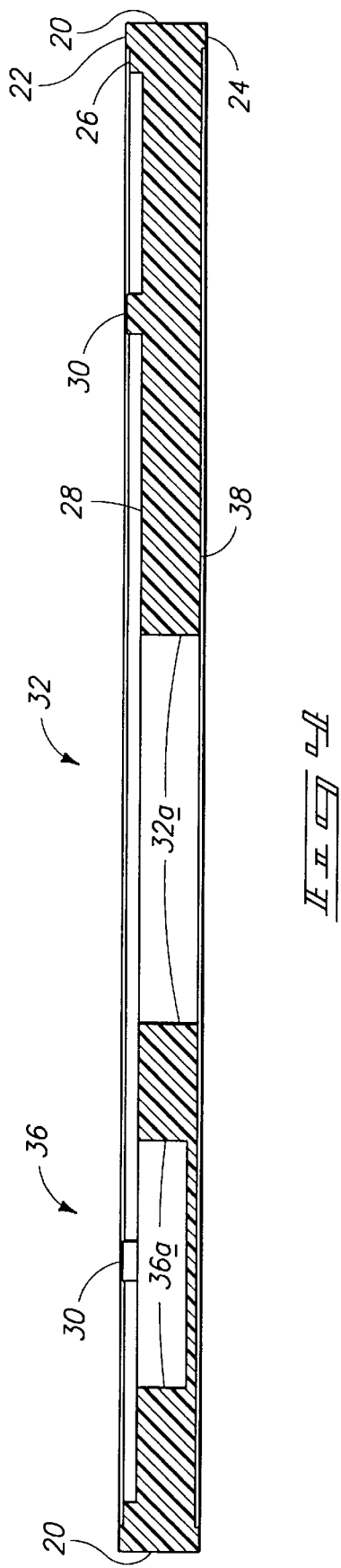

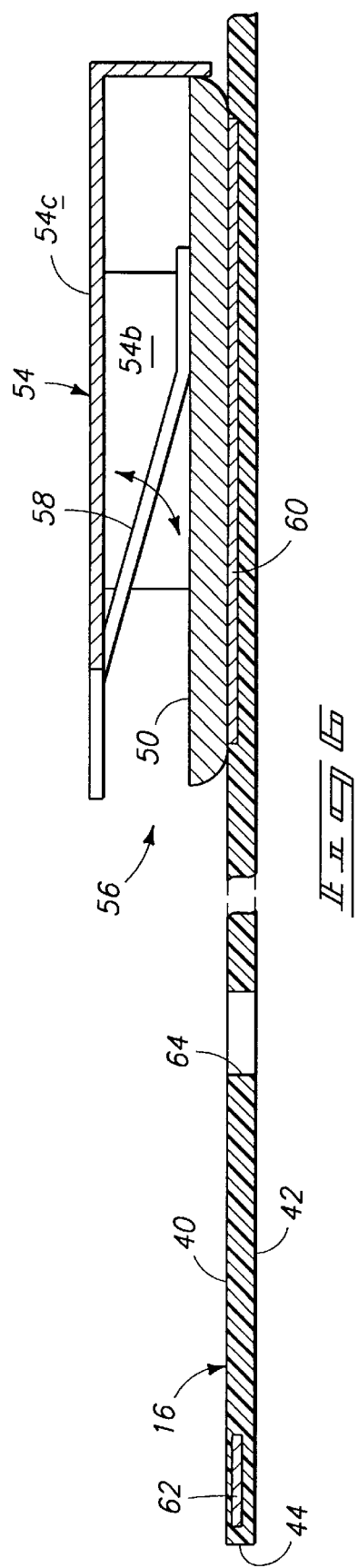

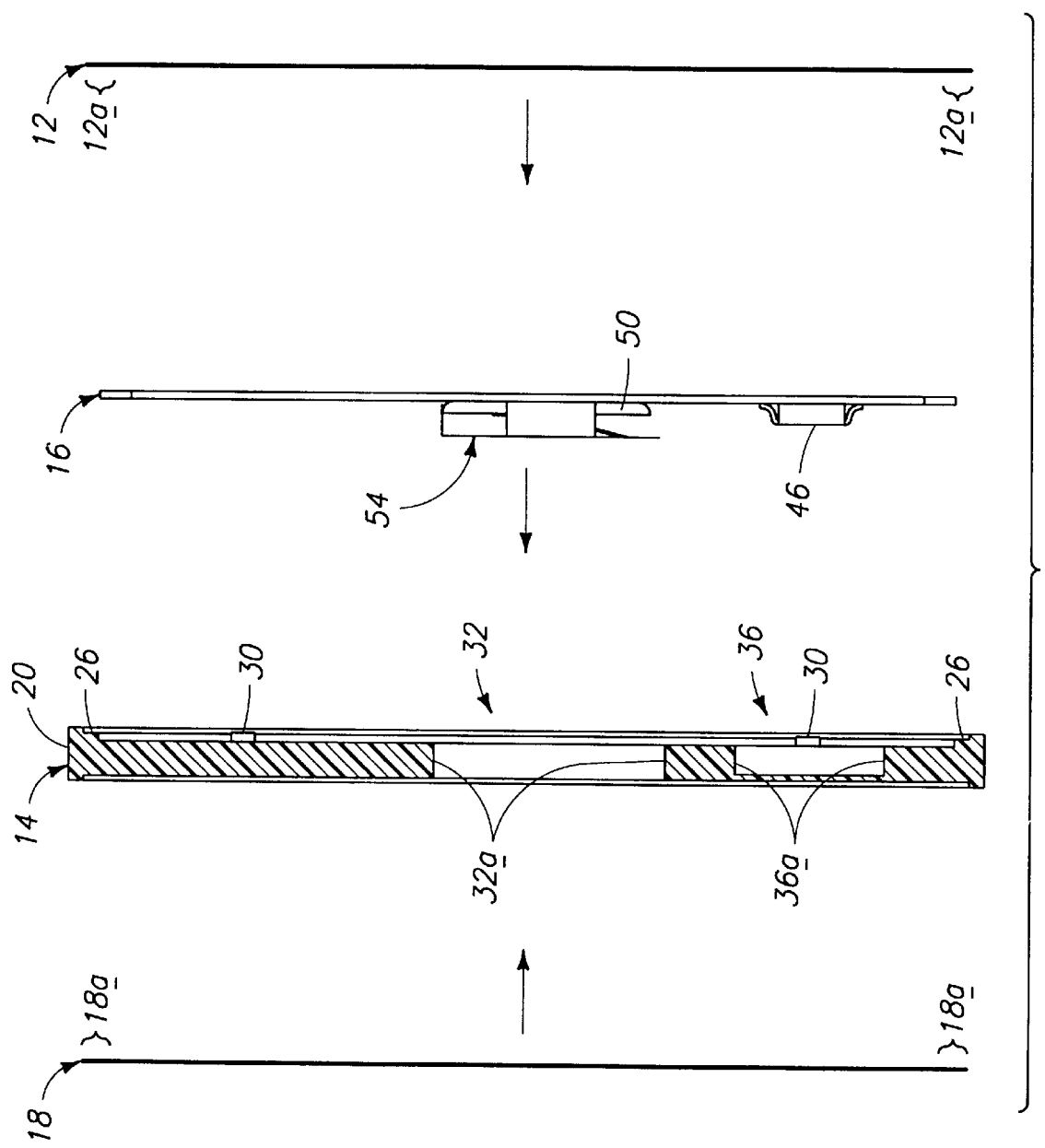

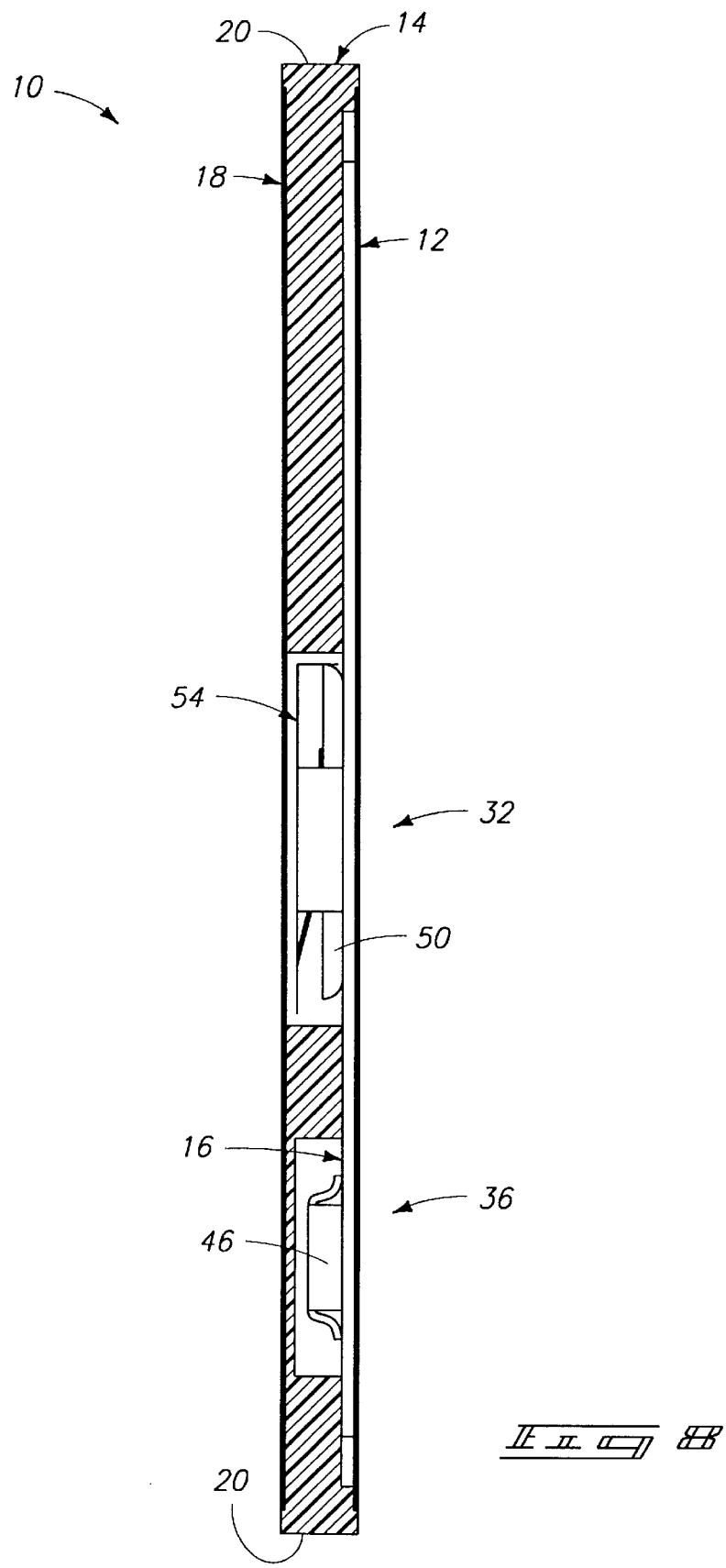

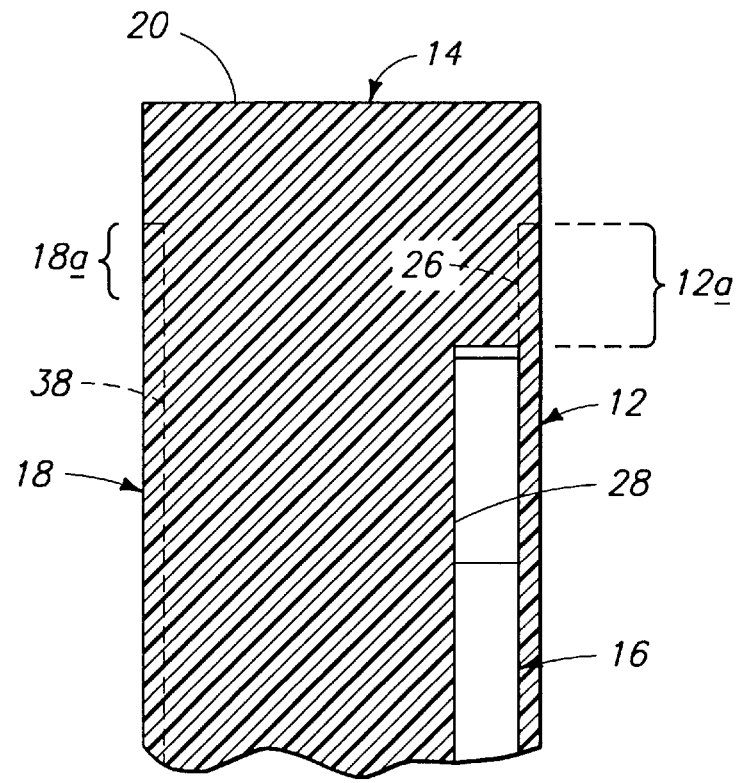
_Fig. 9_
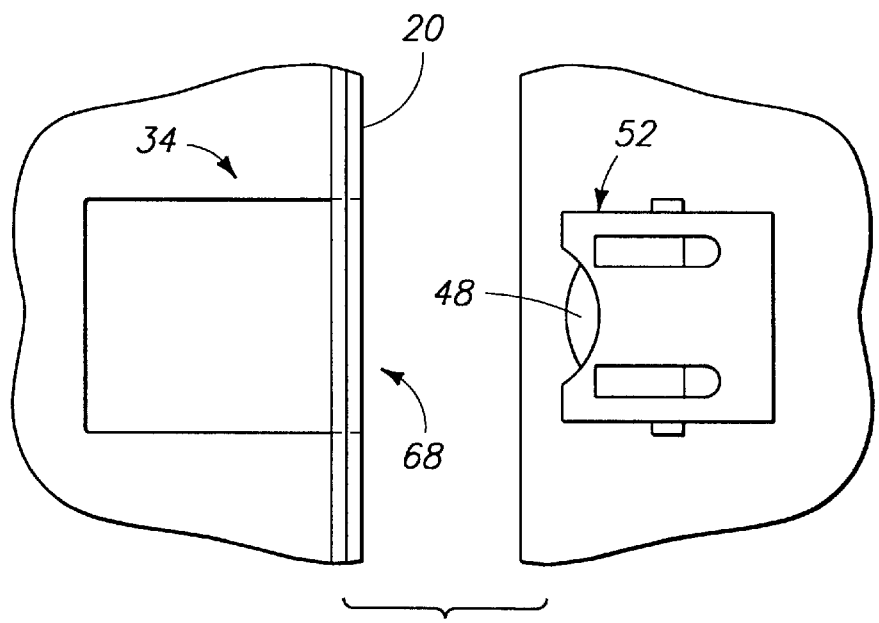
_Fig. 10_

6,024,285

WIRELESS COMMUNICATION DEVICES AND METHODS OF FORMING WIRELESS COMMUNICATION DEVICES

TECHNICAL FIELD

This invention pertains to wireless communication devices and methods of forming wireless communication devices, and in particular smart cards and methods of forming the same.

BACKGROUND OF THE INVENTION

Wireless communication devices such as smart cards typically include an integrated circuit providing both memory and processing functions, have words or pictures printed on them, and control who uses information stored in the integrated circuit and how the information is used. Some smart cards have length and width dimensions corresponding to those of credit cards. The term "smart card", as used herein, is meant to include cards that include microprocessors. Smart cards have many different applications. For example, smart cards can be pre-paid cards used instead of money for making purchases from vending machines, gaming machines, gas stations, car washes, photocopiers, laundry machines, cinemas, fast-food restaurants, retail outlets, or anywhere where cash is used. For example, they are commonly in Europe with public telephones. A timer is used to deduct a balance from the card automatically while a conversation continues. Because the transaction is electronic, the telephone, vending machine, etc. does not need to store cash, so risk of loss due to theft can be reduced. Change does not need to be stored and disbursed, and received payment can be directly wired to a bank. Pre-paid cards can be a form of advertising, because they can have logos or other information printed on them. The user would typically carry the card for weeks before using up the value on the card.

To authenticate a conventional credit card, a telephone call is made to verify the funds are available. Smart cards permit such verification to be performed off-line, thus saving telecommunication charges. Smart cards thus provide an advantage over conventional credit cards. Smart cards can also be used as keys to gain access to restricted areas, such as secure areas of buildings, or to access parking lots.

Radio frequency identification devices (RFIDs) can also be considered smart cards if they include an integrated circuit. RFIDs are described in detail in U.S. patent application Ser. No. 08/705,043, filed Aug. 29, 1996, and incorporated herein by reference. RFIDs comprising integrated circuits may be referred to as intelligent RFIDs or as remote intelligent communication (RIC) devices.

Smart cards will typically comprise a power source, such as a battery, and an integrated circuit, typically provided as a monolithic chip. The smart card will also typically comprise electrical interconnects for connecting the battery to the IC chip, and, in some applications, for connecting the IC chip to terminals which are external of the card. In other instances, the electronic interconnects will comprise an antenna, such as, for example, when the integrated circuit comprises radio frequency identification device circuitry. As smart cards are intended to be conveniently carried by persons, it is desirable to produce smart cards which are relatively thin, preferably having a size and shape similar to credit cards. This enables the cards to be carried on a person, such as, for example, in a person's wallet.

This invention arose out of concerns associated with providing wireless communication devices which are desirably dimensioned to be carried by or on a person. This invention also arose out of concerns with providing wireless communication devices such as smart cards which are formed from material which does not degrade the electrical performance thereof.

SUMMARY OF THE INVENTION

Wireless communication devices and methods of forming the same are described. In one implementation, an integrated circuitry transceiver chip and an antenna are operably coupled and mounted within a housing member. A cover is disposed over the chip and antenna and effectively seals the chip and antenna therewithin. In a preferred implementation, the chip, antenna, and a power source are mounted on a printed circuit substrate which is nestedly received by the housing member and effectively sealed therewithin by the cover. The housing member preferably includes structure which receives at least one of the chip and/or power source to provide a nested, compact device which can be carried by or upon a person. In one aspect, the housing member is formed from a material which does not meaningfully, if at all, degrade the electrical performance of the device. The cover is preferably formed from the same material as the housing member to facilitate assembly of the device through bonding therebetween

BRIEF DESCRIPTION OF THE DRAWINGS

Preferred embodiments of the invention are described below with reference to the following accompanying drawings.

FIG. 4 is a view which is taken along line 4—4 of FIG. 2.

FIG. 5 is a view of the printed circuit substrate which is slightly enlarged from the FIG. 1 view in order to show detail.

FIG. 6 is a view which is taken along line 6—6 of FIG. 5.

FIG. 7 is a side sectional view of the four component parts of FIG. 1 which are shown in an intermediate state of assembly.

FIG. 8 is a side sectional view which is similar to the FIG. 7 view, only slightly enlarged and showing the four component parts in an assembled state.

FIG. 9 is an enlarged view of a portion of FIG. 8 which shows additional detail.

FIG. 10 is a view of a portion of the housing member and printed circuit substrate in accordance with an alternate embodiment.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
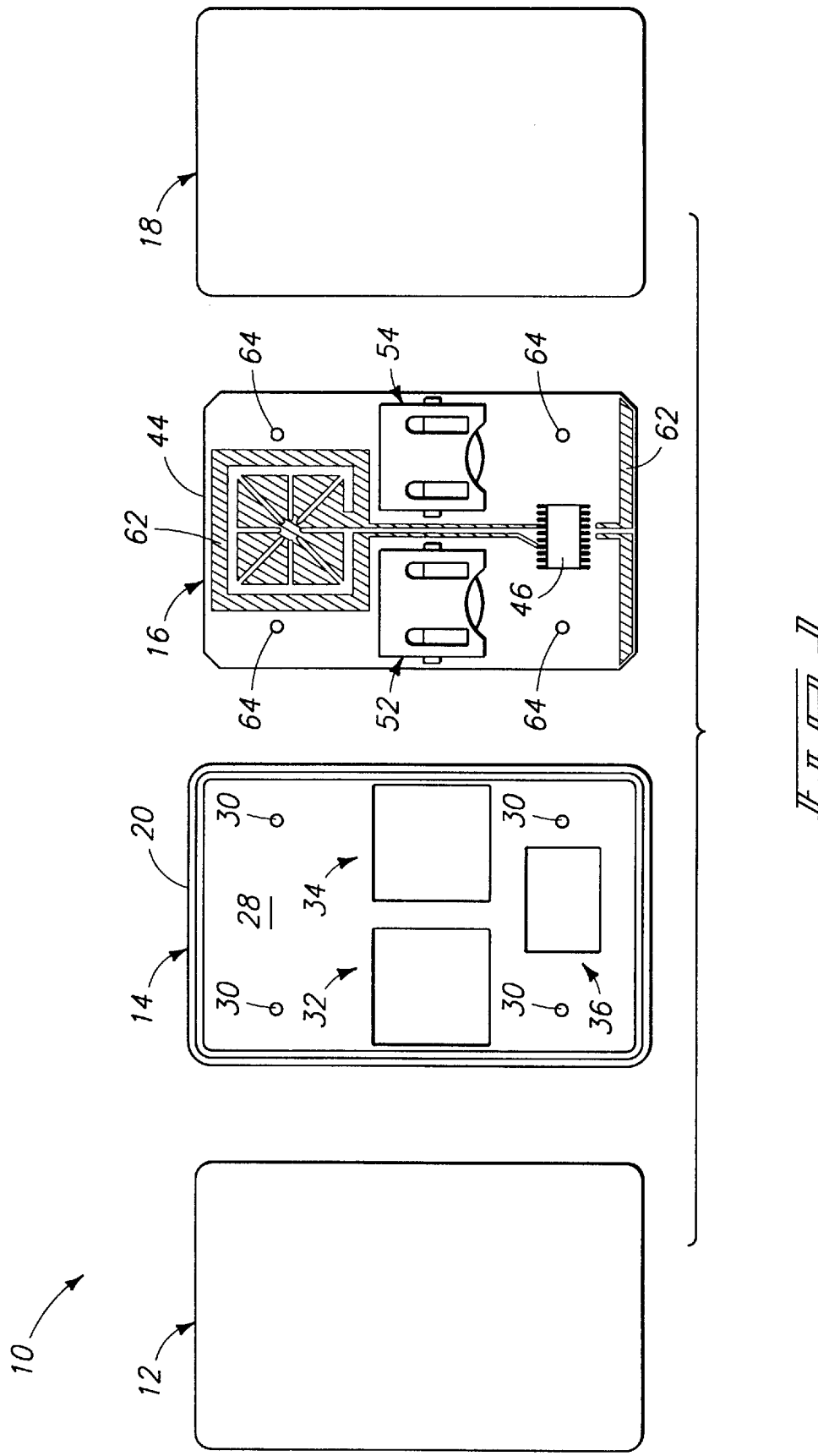
FIG. 1 is a top plan view of a wireless communication device in accordance with a preferred embodiment of the invention. The device is separated into four illustrative component parts which include a pair of covers, a housing member, and a printed circuit substrate.

Referring to FIG. 1, a wireless communication device or smart card in accordance with one preferred implementation of the invention is shown generally at 10. Device 10 is configured for radio frequency operation which includes microwave backscatter. Device 10 is composed of four component parts which are assembled to provide an essentially self-contained communication device. The component parts include a first outer cover 12, a housing member 14, a printed circuit substrate 16 and a second outer cover 18. It is possible, however, for less than four component parts to be utilized. For example, one of the covers could be eliminated as will be described below. The component parts of device 10 are configured and dimensioned such that they fit together in a nested fashion to form a generally compact communication device card as will become apparent below.

Referring to FIGS. 1–4, housing member 14 includes a peripheral edge 20 which defines a generally rectangular shape. A pair of oppositely-facing outermost surfaces 22, 24 (FIGS. 3 and 4) are joined with peripheral edge 20 and extend generally transversely away therefrom and define a thickness therebetween which is preferably no greater than about 200 mils. A ledge 26 is disposed inwardly of and joined with outermost surface 22. Ledge 26 extends around an interior region of the housing member and generally follows the shape defined by peripheral edge 20. The ledge is preferably dimensioned to receive a similarly-shaped cover for purposes discussed below. The housing member also includes a mounting surface 28 which is joined with ledge 26 and which preferably defines a generally planar region inwardly of the ledge.

The mounting surface provides a surface adjacent or against which printed circuit substrate 16 is disposed or received when the device is assembled. To assist in assembling device 10, mounting surface 28 is provided with a plurality of detents 30 which are joined with the surface and extend generally away therefrom. The detents facilitate mounting of the printed circuit substrate by providing registration structure which is alignable with complementary-shaped apertures on the printed circuit substrate so that the two can be conveniently fitted together. Mounting surface 28 includes four such detents 30 which have respective circular cross-sectional shapes which lie in planes which are parallel with or to the plane defined by mounting surface 28.

In accordance with one aspect of the invention, mounting surface 28 includes at least one, and preferably three openings 32, 34, and 36. Openings 32 and 34 are generally square in shape, and opening 36 is generally rectangular in shape. Inwardly of each respective opening and away from mounting surface 28, a plurality of walls join therewith and extend generally transversely away from the mounting surface. Exemplary walls for openings 32, 34, and 36 are illustrated respectively at 32a, 34a, and 36a. The walls may or may not extend entirely through housing member 14. In the illustrated example, walls 32a and 34a extend entirely through the housing member, as shown in FIG. 4. Walls 36a however do not extend through the entirety of the housing member and accordingly extend away from opening 36 a distance which is less than the preferred device thickness of 200 mils. The respective openings are spaced apart from one another over the mounting surface and define separate compartments or receptacles for receiving structure which is carried on board printed circuit substrate 16 as will be described below. Another mounting surface 38 is provided inwardly of peripheral edge 20 and faces generally oppositely of mounting surface 38. Mounting surface 38 is dimensioned and configured to receive the other cover as will be described below.

Referring to FIGS. 1, 5, and 6, printed circuit substrate 16 includes a front side 40 and a back side 42 (FIG. 6). Front and back sides 40, 42 constitute a pair of generally planar, oppositely-facing surfaces which define a thickness of between about 5–35 mils. An outermost edge 44 defines a generally rectangular shape which is smaller in dimension than the rectangular shape defined by peripheral edge 20 of housing member 14. Such dimensions permit the printed circuit substrate to be received proximate or against mounting surface 28 inwardly of peripheral edge 20 and in a nested-like fashion.

Substrate 16 includes an integrated circuitry transceiver chip 46 which is mounted on or supported by the substrate. In accordance with a preferred implementation, chip 46 constitutes a single monolithic integrated circuitry chip which is the only chip mounted on or carried by substrate 16. Substrate 16 is preferably equipped with the capability to provide power to chip 46. This capability can come in the form of conductive structure on the substrate which is configured to receive a power source, as well as the power source itself. In the illustrated example, such includes a power source for providing power to chip 46 in addition to the structure which is utilized to mount the power source on the substrate. Exemplary power sources include a pair of batteries 48, 50 which are mounted on substrate 16 and operably connected with the transceiver chip to provide power thereto. Preferably, the batteries constitute thin profile or button-type batteries which assist in providing device 10 with a desired thickness profile.

Substrate 16 also preferably includes conductive structures which are utilized to mount the respective batteries on the substrate and form the desired electrical connections therewith. Specifically, a pair of conductive battery receptacles 52, 54 are provided on substrate 16 and are elevated thereover. Each receptacle receives one battery. The individual battery receptacles each include a pair of conductive walls 52a, 52b (receptacle 52) and 54a, 54b (receptacle 54) which are joined with substrate 16 and extend generally transversely away therefrom. Individual respective roof portions 52c, 54c are joined with the respective conductive wall pairs and extend laterally therebetween. As shown in FIG. 6, the walls and roof portion define an opening 56 into an interior battery receptacle region which is sized to accommodate insertion and retention of battery 50. The roof portions include at least one spring-biased contact member 58 which is joined with the roof portion and downwardly biased into the interior battery receptacle region to conductively engage a battery which is inserted therewithin. Each battery receptacle includes a pair of contact members. Substrate 16 also includes or supports an electrical contact 60 therewithin which makes conductive contact with the battery which is urged thereagainst by the respective contact members.

An antenna 62 is provided and supported by substrate 16. The antenna can be formed from any suitable conductive material which can be appropriately applied, placed or otherwise disposed over or on the substrate, such as by screen and/or stencil printing. Additionally, any shape of antenna which is suitable for use with desired radio frequencies can be used. In the illustrated example, device 10 is configured for receiving and transmitting radio frequencies in the GigaHertz range, and more specifically radio frequencies around 2.45 GHz. Such radio frequencies include microwave backscatter. Antenna 62 is supported entirely inside outermost edge 44 of substrate 16. The antenna is operably coupled or connected with transceiver chip 46 and batteries 48, 50, and all of which are supported or mounted entirely within the bounds of outermost edge 44. Antenna 62 includes an operative conductive connection 66 with transceiver chip 46 which extends away from the transceiver chip along substrate 16 and between battery receptacles 52, 54.

Substrate 16 also includes a plurality of registration apertures 64 which extend therethrough and are positioned to receive detents 30 on mounting surface 28 to assist in mounting the two together. Accordingly, the apertures have respective cross-sectional shapes in planes which are parallel to the planes of the oppositely-facing printed circuit substrate surfaces, with the shapes being generally complementary to the cross-sectional shapes of the detents. In the illustrated example, such shapes are generally circular.

Figure 2:
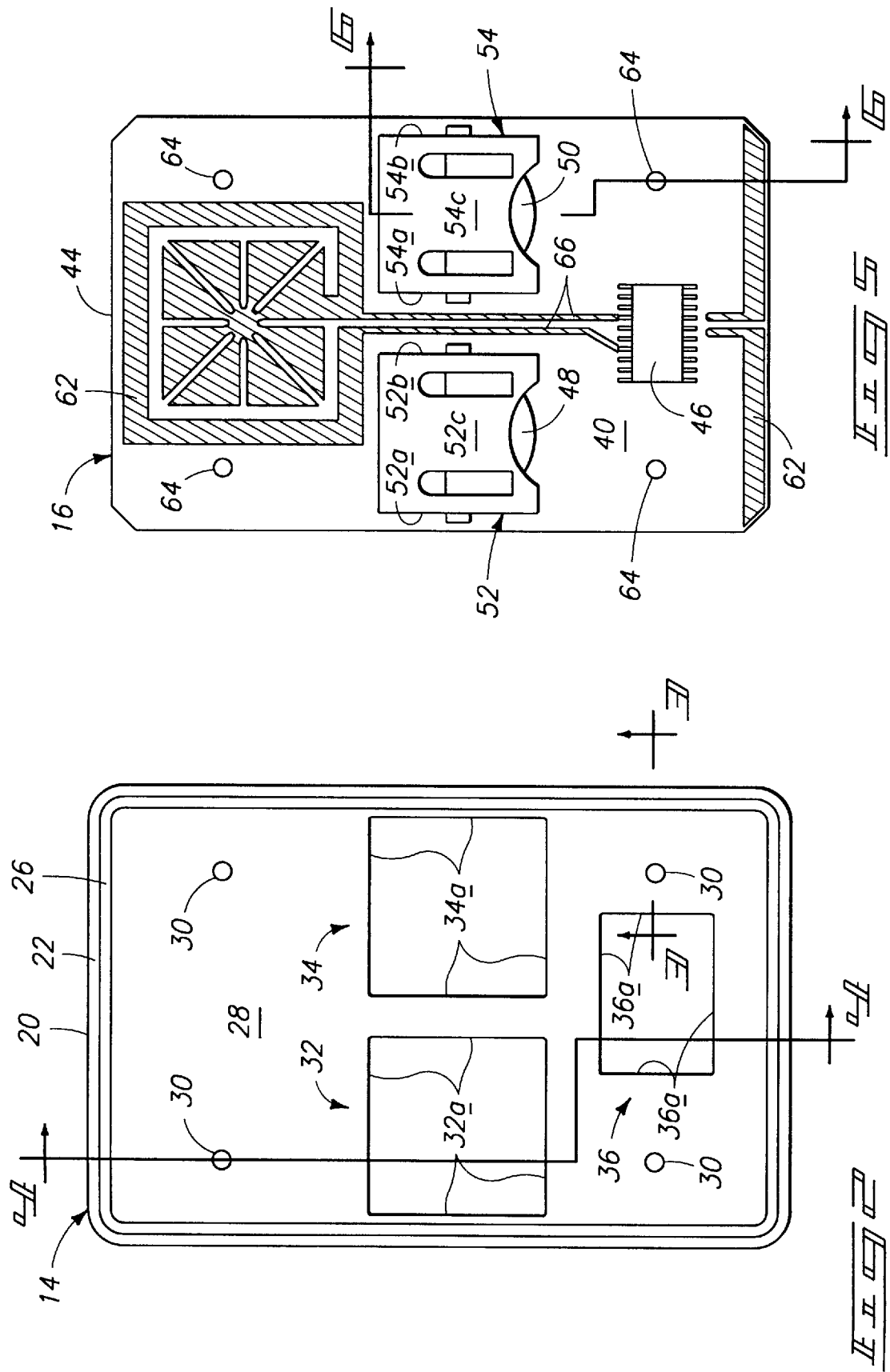
FIG. 2 is a view of the housing member which is slightly enlarged from the FIG. 1 view in order to show detail.
Figure 3:
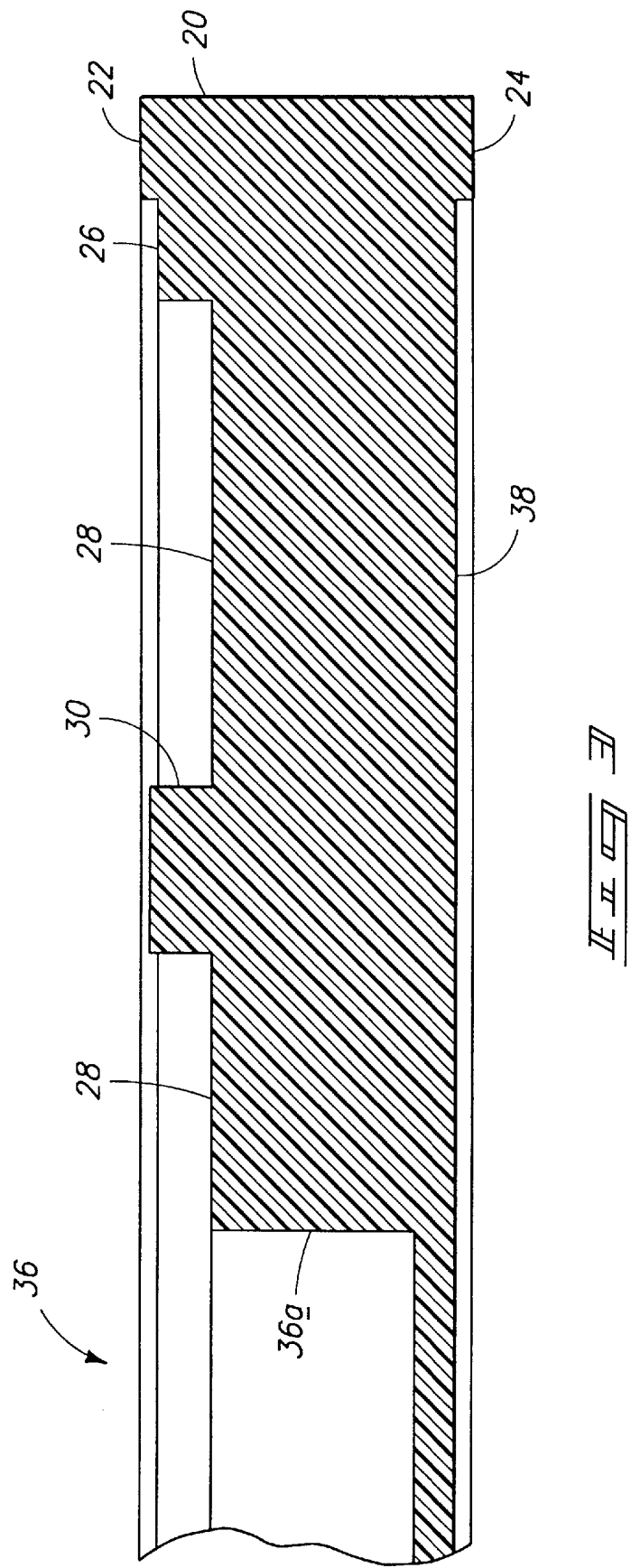
FIG. 3 is a view which is taken along line 3—3 of FIG. 2.

Referring to FIGS. 2 and 5, receptacles 52, 54 are positioned on substrate 16 and in general alignment with respective openings 34, 32. This permits the receptacles and any batteries carried thereby to extend into their respective associated openings and be circumscribed by the respective walls within the openings. This permits device 10 to have a generally compact nested package. In addition, transceiver chip 46 is disposed on substrate 16 in general alignment with opening 36 such that it too can be inserted into the opening and nestedly received thereby when the device is assembled. In a preferred implementation, the overall device is self-contained and includes length, width, and height dimensions which are no greater than about 4-inches, 3-inches, and $^4/_{16}$-inch respectively. FIG. 10 shows an alternate embodiment wherein a port or opening 68 is provided in peripheral edge 20 proximate battery receptacle 52 (when fully assembled) and positioned to enable access thereto from exteriorly of the communication device. Of course, when fully assembled, substrate 16 would be flipped over such that receptacle 52 could be inserted into opening 34 and oriented to face the opposite direction. Battery receptacle 52 is positioned so that battery 48 can be inserted into or through the port for retention by the receptacle. Another port can be provided proximate battery receptacle 54.

Referring to FIGS. 7–9, various states of assembly of device 10 are shown.

FIG. 7 shows an intermediate assembly step in which the component parts of device 10 are generally aligned with one another and ready for placement together and assembly. Battery receptacle 54 is generally aligned with opening 32 (as would be receptacle 52 and opening 34) such that when substrate 16 is brought into engagement with mounting surface 28, the receptacles are received within the compartment defined by each opening's walls. Similarly, transceiver chip 46 is aligned with opening 36 such that it can be inserted thereinto and circumscribed by walls 36a when the device is assembled.

Referring to FIG. 8, substrate 16 has been placed against or proximate mounting surface 28 of the housing member such that the substrate is received entirely within the bounds of peripheral edge 20. Accordingly, the battery receptacles and the transceiver chip extend away from the substrate and into the respective openings mentioned above. The detents on the mounting surface and the apertures within the printed circuit substrate ensure that desired registration occurs between the substrate and the housing member. After placement of the substrate within the housing member, each of covers 12 and 18, having respective thicknesses of between 3–20 mils, are placed into contact with the housing member and subsequently attached to enclose the substrate therewithin. First cover 12 is disposed over substrate 16 and includes an edge region 12a (FIGS. 7 and 9) which is preferably ultrasonically bonded or welded with housing member ledge 26 to form a generally continuous hermetic seal therewith and proximate peripheral edge 20. Energy directors (not specifically shown) in the form of structures which are resident on either of the covers and/or housing member could be provided to focus the vibratory ultrasonic energy to facilitate bonding.

Second cover 18 is joined with housing member 14 proximate outermost mounting surface 38 and preferably includes an edge region 18a which is also ultrasonically bonded with housing member 14 to form a continuous seal therewith. The seals which are formed between ledge 26 and cover 12, and surface 38 and cover 18 are preferably airtight. It is possible, however, for cover 18 to be eliminated by forming housing member 14 to have an integral backing portion which is not specifically shown. In this event, the respective walls of openings 32, 34 would not extend entirely through the housing member. Preferably, the material from which the housing member and covers 12, 18 are formed facilitate ultrasonic bonding therebetween and comprise the same material. An exemplary material is ABS plastic.

The housing member can be injection molded to have any desired shape and/or configuration. Similarly, the cover can be formed to have any desired shape. One advantage of the present invention is that a structurally-stable, substantially rigidified construction is provided which protects the operational components carried within the housing member. Further, the nested configuration and construction reduces the overall size of the device to that which is similar to a credit card in length and width dimension. Moreover, as the device is intended and configured for use in connection with radio frequencies including microwave backscatter, the material from which the housing member and cover are formed do not degrade the electrical performance of the device as do some materials such as potting epoxy, metal and the like. Further, as the housing member and the cover(s) comprise only plastic material, there is no metal or conductive enclosure material which could shield or otherwise attenuate the desired radio frequencies.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A wireless communication device comprising:
   a substrate;
   an integrated circuitry transceiver chip, an antenna, and a battery operably coupled with one another and supported by the substrate;
   a housing member comprising a peripheral edge and a pair of oppositely-facing mounting surfaces inside the peripheral edge, one of the individual mounting surfaces comprising a plurality of openings therein;
   the substrate being received by the housing member adjacent the one mounting surface, the transceiver chip and the battery extending into separate openings of the plurality of openings;
   a first cover disposed over the substrate and joined with the housing member and defining a generally continuous seal therewith proximate the housing member's peripheral edge; and a second cover disposed over the other of the mounting surfaces and joined with the housing member and defining a generally continuous seal therewith proximate the peripheral edge, the peripheral edge defining a width dimension generally transverse the mounting surfaces of not more than about 200 mils.

2. The wireless communication device of claim 1, wherein the housing member, the first cover, and the second cover comprise the same material.

3. The wireless communication device of claim 1, wherein the device is configured for transmitting microwave backscatter.

4. A wireless communication device comprising:

a housing member having a generally rectangularly-shaped peripheral edge and a mounting surface inwardly of the peripheral edge, the mounting surface comprising a plurality of openings, the housing member further comprising a plurality of walls disposed inwardly of the peripheral edge and joining with respective openings of the plurality of openings, the walls extending generally away from the mounting surface and defining a plurality of compartments therein;

an integrated circuitry transceiver chip supported by the mounting surface and received within one of the compartments;

a battery operably coupled with the transceiver chip and supported by the mounting surface, the battery extending into a different compartment;

an antenna operably coupled with the transceiver chip and supported by the mounting surface, the antenna being disposed entirely inside the housing member's peripheral edge; and a cover disposed over the mounting surface and bonded with the housing member proximate the peripheral edge, the cover being sized to provide an essentially continuous seal proximate the entire peripheral edge, the housing member and cover providing a self-contained communication device package having length, width, and height dimensions no greater than about 4-inches, 3-inches, and $\frac{4}{16}$-inch respectively.

5. The wireless communication device of claim 4, wherein the housing member and the cover comprise the same material.

6. The wireless communication device of claim 4, wherein the device is configured to transmit microwave backscatter.

7. A wireless communication card comprising:

a generally rectangularly-shaped plastic housing member having a peripheral edge; a pair of oppositely-facing outermost surfaces joined with the peripheral edge and extending generally transversely away therefrom and defining a thickness therebetween no greater than about 200 mils; a ledge joined with one of the outermost surfaces and extending around an interior region of the housing member and generally following the peripheral edge; a mounting surface joined with the ledge and defining a generally planar region inwardly of the ledge; the mounting surface having a pair of openings disposed therein and respective walls which are joined with the openings and which extend generally transversely away from the planar mounting surface, the walls of the pair of openings respectively extending through the plastic housing member; the mounting surface having another opening therein which is spaced from the pair of openings and a wall which is joined with the another opening and which extends generally transversely away from the mounting surface a distance which is less than 200 mils; at least two detents joined with the planar mounting surface and extending away therefrom, the detents having respective cross-sectional shapes which lie in planes which are parallel with the mounting surface plane;

a generally rectangularly-shaped printed circuit substrate smaller in dimension than the plastic housing member; the printed circuit substrate having a pair of generally planar oppositely-facing surfaces and a thickness therebetween sized to enable the printed circuit substrate to be nestedly received by the housing member; the printed circuit substrate further having an outer edge region disposed proximate the housing member ledge; at least two registration apertures extending through the printed circuit substrate and positioned to receive the respective at least two detents on the mounting surface, the apertures having respective cross-sectional shapes in planes parallel to the planes of the oppositely-facing printed circuit substrate surfaces which are generally complementary to the respective cross-sectional shapes of the detents;

a single integrated circuitry chip mounted on the printed circuit substrate and positioned thereon in registration with the another opening in the mounting surface, the chip having a portion which extends into the another opening; the chip comprising a transceiver chip;

a pair of conductive battery receptacles mounted on the printed circuit substrate; individual battery receptacles having a pair of conductive walls joined with the printed circuit substrate and extending generally transversely away therefrom and a roof portion joined to the conductive walls and extending laterally therebetween, the walls and roof portion defining an opening into an interior battery receptacle region sized to accommodate insertion of a thin profile battery; individual roof portions having at least one spring-biased contact member disposed within the interior battery receptacle region and configured to conductively engage a battery inserted therewithin and urge the battery against the printed circuit substrate; individual battery receptacles being positioned on the printed circuit substrate in registration with the respective openings of the pair of openings in the mounting surface and extending thereinto and being circumscribed by the walls of the respective openings; the battery receptacles being spaced from one another on the printed circuit substrate and operably connected with the single integrated circuitry chip;

an antenna connected with the transceiver chip and supported by the printed circuit substrate; the antenna being dimensioned to fit entirely within the printed circuit substrate; the antenna having an operative conductive connection with the transceiver chip with extends away from the transceiver chip along the printed circuit substrate and between the battery receptacles;

a first cover disposed over the printed circuit substrate and the mounting surface and nestedly received by the housing member; the first cover having an edge region which is bonded with the housing member ledge to form a continuous seal therewith proximate the housing member's peripheral edge; and a second cover joined with the housing member proximate the outermost surface of the housing member which does not have the ledge joined therewith; the second cover having an edge region which is bonded with the housing member to form a continuous seal therewith proximate the housing member peripheral edge.

8. A wireless communication device comprising:

a substrate;

an integrated circuitry transceiver chip, an antenna, and a battery receptacle operably coupled with one another and supported by the substrate;

a housing member comprising a peripheral edge and a pair of oppositely-facing mounting surfaces inside the peripheral edge, one of the individual mounting surfaces comprising a plurality of openings therein;

the substrate being received by the housing member adjacent the one mounting surface, the transceiver chip and the battery receptacle extending into separate openings of the plurality of openings;

a first cover disposed over the substrate and joined with the housing member and defining a generally continuous seal therewith proximate the housing member's peripheral edge; and a second cover disposed over the other of the mounting surfaces and joined with the housing member and defining a generally continuous seal therewith proximate the peripheral edge.

9. The wireless communication device of claim 8, wherein the housing member, the first cover, and the second cover comprise the same material.

10. The wireless communication device of claim 8, wherein the device is configured for transmitting microwave backscatter.

11. A wireless communication device comprising:

a housing member having a generally rectangularly-shaped peripheral edge and a mounting surface inwardly of the peripheral edge, the mounting surface comprising a plurality of openings, the housing member further comprising a plurality of walls disposed inwardly of the peripheral edge and joining with respective openings of the plurality of openings, the walls extending generally away from the mounting surface and defining a plurality of compartments therein;

an integrated circuitry transceiver chip supported by the mounting surface and received within one of the compartments;

a battery receptacle extending into a different compartment than is the integrated circuitry transceiver chip;

an antenna operably coupled with the transceiver chip and supported by the mounting surface; and a cover disposed over the mounting surface and bonded with the housing member proximate the peripheral edge, the cover providing an essentially continuous seal about the peripheral edge.

12. The wireless communication device of claim 11, wherein the housing member and the cover comprise the same material.

13. The wireless communication device of claim 11, wherein the device is configured to transmit microwave backscatter.

14. A wireless communication card comprising:

a generally rectangularly-shaped plastic housing member having a peripheral edge; a pair of oppositely-facing outermost surfaces joined with the peripheral edge and extending generally transversely away therefrom and defining a thickness therebetween; a ledge joined with one of the outermost surfaces and extending around an interior region of the housing member and generally following the peripheral edge; a mounting surface joined with the ledge and defining a generally planar region inwardly of the ledge; the mounting surface having a pair of openings disposed therein and respective walls which are joined with the openings and which extend generally transversely away from the planar mounting surface, the walls of the pair of openings respectively extending through the plastic housing member; the mounting surface having another opening therein which is spaced from the pair of openings and a wall which is joined with the another opening and which extends generally transversely away from the mounting surface; at least two detents joined with the planar mounting surface and extending away therefrom, the detents having respective cross-sectional shapes which lie in planes which are parallel with the mounting surface plane;

a generally rectangularly-shaped printed circuit substrate smaller in dimension than the plastic housing member; the printed circuit substrate having a pair of generally planar oppositely-facing surfaces and a thickness therebetween sized to enable the printed circuit substrate to be nestedly received by the housing member; the printed circuit substrate further having an outer edge region disposed proximate the housing member ledge; at least two registration apertures extending through the printed circuit substrate and positioned to receive the respective at least two detents on the mounting surface, the apertures having respective cross-sectional shapes in planes parallel to the planes of the oppositely-facing printed circuit substrate surfaces which are generally complementary to the respective cross-sectional shapes of the detents;

a single integrated circuitry chip mounted on the printed circuit substrate and positioned thereon in registration with the another opening in the mounting surface, the chip having a portion which extends into the another opening; the chip comprising a transceiver chip;

a pair of individual battery receptacles mounted on the printed circuit substrate; each of the pair of individual battery receptacles having a pair of conductive walls joined with the printed circuit substrate and extending generally transversely away therefrom and a roof portion joined to the conductive walls and extending laterally therebetween, the walls and roof portion defining an opening into an interior battery receptacle region sized to accommodate insertion of a thin profile battery; individual roof portions having at least one spring-biased contact member disposed within the interior battery receptacle region and configured to conductively engage a battery inserted therewithin and urge the battery against the printed circuit substrate; each of the pair of individual battery receptacles being positioned on the printed circuit substrate in registration with the respective openings of the pair of openings in the mounting surface and extending thereinto and being circumscribed by the walls of the respective openings; the battery receptacles being spaced from one another on the printed circuit substrate and operably connected with the single integrated circuitry chip;

an antenna connected with the transceiver chip and supported by the printed circuit substrate; the antenna being dimensioned to fit entirely within the printed circuit substrate; the antenna having an operative conductive connection with the transceiver chip with extends away from the transceiver chip along the printed circuit substrate and between the pair of battery receptacles;

a first cover disposed over the printed circuit substrate and the mounting surface and nestedly received by the housing member; the first cover having an edge region which is bonded with the housing member ledge to form a continuous seal therewith proximate the housing member's peripheral edge; and a second cover joined with the housing member proximate the outermost surface of the housing member which does not have the ledge joined therewith; the second cover having an edge region which is bonded with the housing member to form a continuous seal therewith proximate the housing member peripheral edge.

\* \* \* \* \*